(12) United States Patent
Ye

(10) Patent No.: US 9,367,171 B2
(45) Date of Patent: Jun. 14, 2016

(54) TOUCHSCREEN RESPONSE METHOD AND TERMINAL

(71) Applicant: DONGGUAN GOLDEX COMMUNICATION TECHNOLOGY CO., LTD., Dongguan (CN)

(72) Inventor: Zegang Ye, Dongguan (CN)

(73) Assignee: DONGGUAN GOLDEX COMMUNICATION TECHNOLOGY CO., LTD., Dongguan, Guangdong (CN)

( * ) Notice: Subject to any disclaimer, the term of this patent is extended or adjusted under 35 U.S.C. 154(b) by 27 days.

(21) Appl. No.: 14/372,005

(22) PCT Filed: Oct. 14, 2013

(86) PCT No.: PCT/CN2013/085164
§ 371 (c)(1),
(2) Date: Jul. 11, 2014

(87) PCT Pub. No.: WO2014/086205
PCT Pub. Date: Jun. 12, 2014

(65) Prior Publication Data
US 2014/0354573 A1 Dec. 4, 2014

(30) Foreign Application Priority Data
Dec. 3, 2012 (CN) .......................... 2012 1 0508671

(51) Int. Cl.
*G06F 3/041* (2006.01)
*G06F 3/0488* (2013.01)
(52) U.S. Cl.
CPC ............ *G06F 3/0418* (2013.01); *G06F 3/0412* (2013.01); *G06F 3/0488* (2013.01)

(58) Field of Classification Search
CPC ... G06F 3/0412; G06F 3/0416; G06F 3/0418; G06F 3/0488
USPC ........................................ 345/173; 178/18.02
See application file for complete search history.

(56) References Cited

U.S. PATENT DOCUMENTS

| 6,411,285 | B1* | 6/2002 | Miyazawa | G06F 3/0418 345/173 |
| 8,952,867 | B2* | 2/2015 | Urawaki | G06F 1/1615 345/1.1 |
| 2008/0259048 | A1* | 10/2008 | Touyamasaki | G03G 15/5016 345/173 |
| 2011/0216022 | A1* | 9/2011 | Kawamoto | G06F 3/041 345/173 |
| 2014/0184558 | A1* | 7/2014 | Midholt | G06F 3/041 345/174 |
| 2014/0267177 | A1* | 9/2014 | Bathiche | G06F 3/0488 345/178 |
| 2014/0267178 | A1* | 9/2014 | Bathiche | G06F 3/0488 345/178 |
| 2014/0267179 | A1* | 9/2014 | Bathiche | G06F 3/0418 345/178 |

* cited by examiner

*Primary Examiner* — Tom Sheng
(74) *Attorney, Agent, or Firm* — Shimokaji IP

(57) ABSTRACT

Embodiments of the present invention disclose a touchscreen response method and a terminal, the method includes: acquiring center point coordinates of a touch when a touchscreen receives a touch operation; adjusting the center point coordinates of the touch according to a mode of a terminal and a gradient of the touchscreen; and responding to the touch operation according to the adjusted center point coordinates. The method may enable a touchscreen response to the touch operation of a user to meet the actually intended use of the user, increase the accuracy of touch response, improve user touch experience, and enable the terminal to be more intelligent.

8 Claims, 4 Drawing Sheets

TOUCHSCREEN RESPONSE METHOD AND TERMINAL

This application claims priority to the Chinese Patent Application No. 201210508671.X, filed with the Chinese Patent Office on Dec. 3, 2012 and entitled "TOUCHSCREEN RESPONSE METHOD AND TERMINAL", the content of which is incorporated herein by reference in its entirety for all purposes.

TECHNICAL FIELD

The present disclosure relates to the field of electronic product technologies, and in particular, to a touchscreen response method and a terminal.

BACKGROUND

With the continuous development and optimization of electronic technologies, terminals such as mobile phones and tablet computers have become an indispensable part of people's life. People may use these terminals not only for communication but also for file transmission, photographing, playing games, and the like.

With the development of technologies, most terminals employ touchscreens to save areas of physical keypad and enlarge use areas of screens, thus providing users with sensuous enjoyment. A terminal in the prior art, generally, makes a response according to a touch center point extracted from a touch area touched on the touchscreen by a finger of a user; when the touchscreen of the terminal is in a different position, a touch position of a user's finger on the touchscreen may have an offset relative to the center point of the touch area. Therefore, in the prior solution, a response action made by using a center point as a touch response point may deviate from the actually intended use of the user, which reduces the accuracy of the touch response and the intelligence of the terminal.

SUMMARY

Embodiments of the present invention provide a touchscreen response method and a terminal, which may increase the accuracy of touch response and improve the intelligence of the terminal.

An embodiment of the present invention provides a touchscreen response method, including:

acquiring center point coordinates of a touch when a touchscreen receives a touch operation;

adjusting the center point coordinates of the touch according to a mode of a terminal and a gradient of the touchscreen; and responding to the touch operation according to the adjusted center point coordinates.

Accordingly, an embodiment of the present invention also provides a touchscreen response terminal, including:

a coordinate acquiring module, configured to acquire center point coordinates of a touch when a touchscreen receives a touch operation;

an adjusting module, configured to adjust the center point coordinates of the touch according to a mode of a terminal and a gradient of the touchscreen; and a responding module, configured to respond to the touch operation according to the adjusted center point coordinates.

In the embodiments of the present invention, the center point coordinates of a touch are accordingly adjusted by determining the mode of the terminal and the gradient of the touchscreen so as to respond to the touch operation of a user, which may enable a touchscreen response to the touch operation of the user to meet the actually intended use of the user, increase touch response accuracy, improve user touch experience, and further enable a terminal to be more intelligent.

BRIEF DESCRIPTION OF DRAWINGS

To make the technical solutions of the embodiments of the present invention clearer, accompanying drawings for illustrating the embodiments of the present invention are briefly described below. Apparently, the accompanying drawings illustrate some exemplary embodiments of the present invention only, and persons with ordinary skill in the art may derive other drawings from such accompanying drawings without any creative effort.

DESCRIPTION OF EMBODIMENTS

The technical solutions in the embodiments of the present invention are clearly and completely described as follows with reference to the accompanying drawings in the embodiments of the present invention. Apparently, the described embodiments are merely a part, rather than all of the embodiments of the present invention. All other embodiments obtained by persons with ordinary skill in the art, based on the embodiments of the present invention, without creative efforts shall fall within the protection scope of the present invention.

In the embodiments of the present invention, center point coordinates of a touch are accordingly adjusted by determining a mode of a terminal and a gradient of a touchscreen so as to respond to a touch operation of a user. The terminal may be a mobile phone, a tablet computer, etc. The terminal is provided with a built-in sensor, the sensor may be a gravity acceleration sensor, a direction sensor, and the like. The mode of the terminal and the gradient of the touchscreen may be detected by using the sensor.

The mode of the terminal may include a portrait mode and a landscape mode. The touchscreen of the terminal is provided with a built-in pixel coordinate system. The pixel coordinate system includes a horizontal axis X and a vertical axis Y. Unless otherwise specified, in the subsequent embodiments of the present invention, the terminal being in the portrait mode means that the X axis of the touchscreen of the terminal is parallel to the horizontal plane, and the terminal being in the landscape mode means that the Y axis of the touchscreen of the terminal is parallel to the horizontal plane. The gradient of the touchscreen refers to an angle between the touchscreen and the horizontal plane.

Embodiment 1

Figure 1:
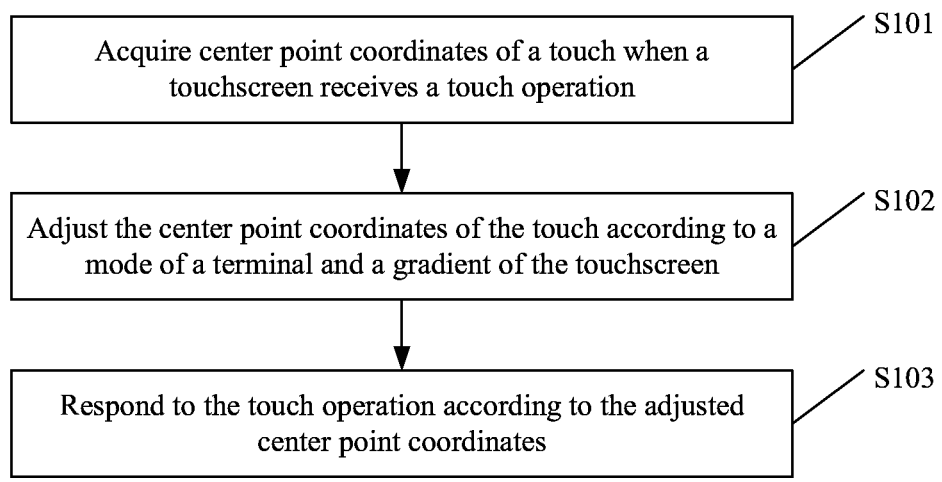
FIG. 1 is a schematic flowchart of a first embodiment for illustrating a touchscreen response method according to the present invention.

Referring to FIG. 1, FIG. 1 is a schematic flowchart of a first embodiment for illustrating a touchscreen response method according to the present invention. As shown in FIG. 1, the method according to the embodiment of the present invention includes the following steps.

S101: acquiring center point coordinates of a touch when a touchscreen receives a touch operation;

Specifically, when the touchscreen receives the touch operation, preferably, a terminal acquires the area that a user's finger touches on the touchscreen, and extracts center point coordinates of the area. The center point coordinates may be coordinate values of the center point or pixel values of the center point.

S102: adjusting the center point coordinates of the touch according to a mode of the terminal and a gradient of the touchscreen;

Specifically, the mode of the terminal may be a portrait mode or a landscape mode, and the gradient of the touchscreen may be an angle between the touchscreen and the horizontal plane. Preferably, the terminal adjusts the center point coordinates of the touch of the user according to the present mode of the terminal and the angle between the touchscreen and the horizontal plane.

It should be noted that the portrait mode and the landscape mode are separately described in detail as follows with reference to FIG. 2 and FIG. 3.

Figure 2:
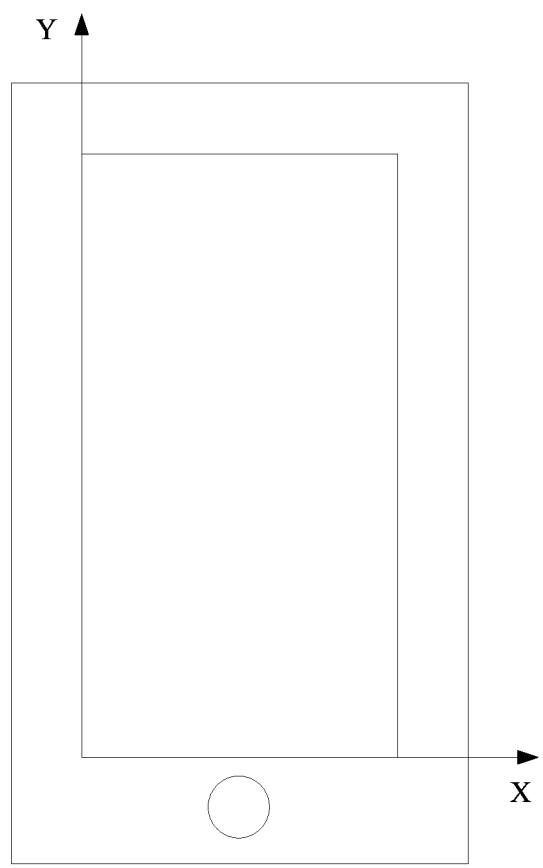
FIG. 2 is a schematic diagram of a portrait mode of a terminal according to an embodiment of the present invention.

Referring to FIG. 2 at the same time, FIG. 2 is a schematic diagram of a portrait mode of a terminal according to an embodiment of the present invention. As illustrated in FIG. 2, when the terminal is in the portrait mode, the terminal may identify by default the bottom side of the touchscreen as an X axis and the left side of the touchscreen as a Y axis. In this case, a range of the angle between the touchscreen and the horizontal plane may be from −90 degrees to 90 degrees.

In a first implementation manner, the center point coordinates are the coordinate values of the center point; when the angle is from 0 degree to 4 degrees or from −4 degrees to 0 degree, 0 is added to the vertical coordinate value of the center point of the touch; when the angle is from 5 degrees to 30 degrees or from −30 degrees to −5 degrees, 1 is added to the vertical coordinate value of the center point of the touch; when the angle is from 31 degrees to 60 degrees or from −60 degrees to −31 degrees, 2 is added to the vertical coordinate value of the center point of the touch; and when the angle is from 61 degrees to 90 degrees or from −90 degrees to −61 degrees, 3 is added to the vertical coordinate value of the center point of the touch.

In a second implementation manner, the center point coordinates are the pixel values of the center point; when the angle is from 0 degree to 4 degrees or from −4 degrees to 0 degree, 0 is added to the vertical pixel value of the center point of the touch; when the angle is from 5 degrees to 30 degrees or from −30 degrees to −5 degrees, 1 is added to the vertical pixel value of the center point of the touch; when the angle is from 31 degrees to 60 degrees or from −60 degrees to −31 degrees, 2 is added to the vertical pixel value of the center point of the touch; and when the angle is from 61 degrees to 90 degrees or from −90 degrees to −61 degrees, 3 is added to the vertical pixel value of the center point of the touch.

Figure 3:
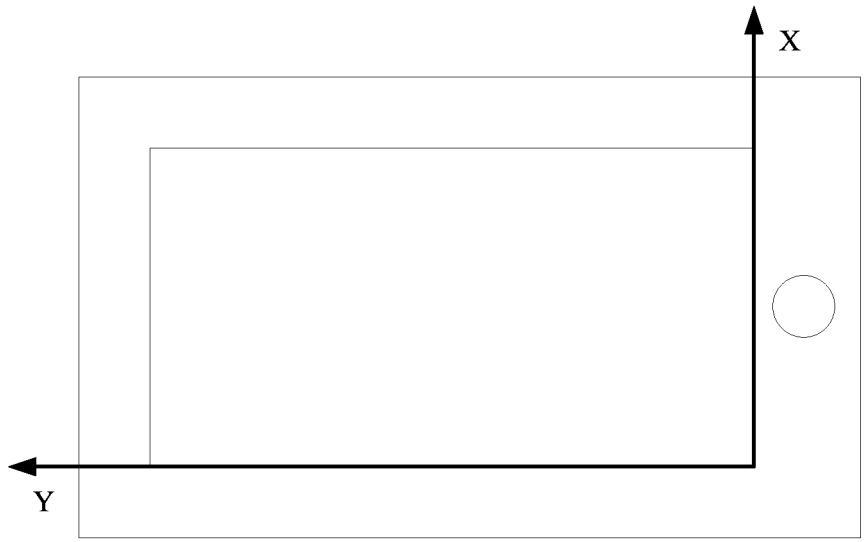
FIG. 3 is a schematic diagram of a landscape mode of a terminal according to an embodiment of the present invention.

Referring to FIG. 3 at the same time, FIG. 3 is a schematic diagram of a landscape mode of a terminal according to an embodiment of the present invention. As illustrated in FIG. 3, when the terminal is in the landscape mode, the terminal may identify by default the right side of the touchscreen as an X axis and the bottom side of the touchscreen as a Y axis. In this case, a range of the angle between the touchscreen and the horizontal plane may be from −180 degrees to 180 degrees.

In a first implementation manner, the center point coordinates are the coordinate values of the center point; when the angle is from 1 degree to 4 degrees or from −4 degrees to −1 degree, 0 is added to the horizontal coordinate value of the center point of the touch; when the angle is from 5 degrees to 60 degrees, 1 is added to the horizontal coordinate value of the center point of the touch; when the angle is from 61 degrees to 120 degrees, 2 is added to the horizontal coordinate value of the center point of the touch; when the angle is from 121 degrees to 180 degrees, 3 is added to the horizontal coordinate value of the center point of the touch. When the angle is from −60 degrees to −5 degrees, 1 is subtracted from the horizontal coordinate value of the center point of the touch; when the angle is from −120 degrees to −61 degrees, 2 is subtracted from the horizontal coordinate value of the center point of the touch; and when the angle is from −180 degrees to −121 degrees, 3 is subtracted from the horizontal coordinate value of the center point of the touch.

In a second implementation manner, the center point coordinates are the pixel values of the center point; when the angle is from 1 degree to 4 degrees or from −4 degrees to −1 degree, 0 is added to the horizontal pixel value of the center point of the touch; when the angle is from 5 degrees to 60 degrees, 1 is added to the horizontal pixel value of the center point of the touch; when the angle is from 61 degrees to 120 degrees, 2 is added to the horizontal pixel value of the center point of the touch; when the angle is from 121 degrees to 180 degrees, 3 is added to the horizontal pixel value of the center point of the touch; when the angle is from −60 degrees to −5 degrees, 1 is subtracted from the horizontal pixel value of the center point of the touch; when the angle is from −120 degrees to −61 degrees, 2 is subtracted from the horizontal pixel value of the center point of the touch; and when the angle is from −180 degrees to −121 degrees, 3 is subtracted from the horizontal pixel value of the center point of the touch.

S103: responding to the touch operation according to the adjusted center point coordinates;

Specifically, a response to the touch operation of the user is made according to the adjusted center point coordinates of the user's touch.

In the embodiments of the present invention, the center point coordinates of a touch are accordingly adjusted by determining the mode of the terminal and the gradient of the touchscreen so as to respond to the touch operation of a user, which may enable a touchscreen response to the touch operation of the user to meet the actually intended use of the user, increase the accuracy of touch response, improve touch experience of the user, and further enable the terminal to be more intelligent.

Embodiment 2

Figure 4:
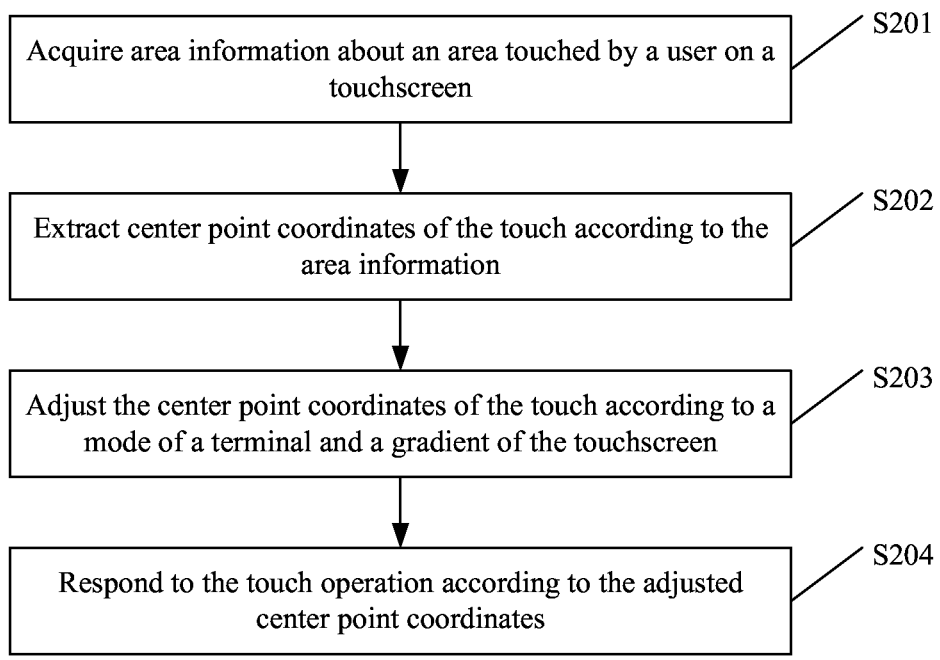
FIG. 4 is a schematic flowchart of a second embodiment for illustrating a touchscreen response method according to the present invention.

Referring to FIG. 4. FIG. 4 is a schematic flowchart of a second embodiment for illustrating a touchscreen response method according to the present invention. As shown in FIG. 4, the method according to the embodiment of the present invention includes the following steps:

S201: acquiring area information about an area touched by a user on a touchscreen.

Specifically, when the touchscreen receives a touch operation of the user, the terminal may obtain the area information about an area touched by the user's finger on the touchscreen, where the area information includes a plurality of pixels.

S202: extracting center point coordinates of the touch according to the area information.

Specifically, coordinates of the center pixel may be extracted according to the coordinates of the plurality of pixels included in the area information. The coordinates of the center pixel may be coordinate values of the center point or pixel values of the center point.

S203: adjusting the center point coordinates of the touch according to a mode of a terminal and a gradient of the touchscreen.

S204: responding to the touch operation according to the adjusted center point coordinates.

For details about steps S203 and S204, reference may be made respectively to the steps S102 and S103 in the Embodiment 1, which are not described herein any further.

In the embodiments of the present invention, the center point coordinates of a touch are accordingly adjusted by determining the mode of the terminal and the gradient of the touchscreen to respond to the touch operation of the user, which may enable a touchscreen response to the touch operation of the user to meet the actually intended use of the user, increase the accuracy of touch response, and improve touch experience of the user, and further enable the terminal to be more intelligent.

Embodiment 3

Figure 5:
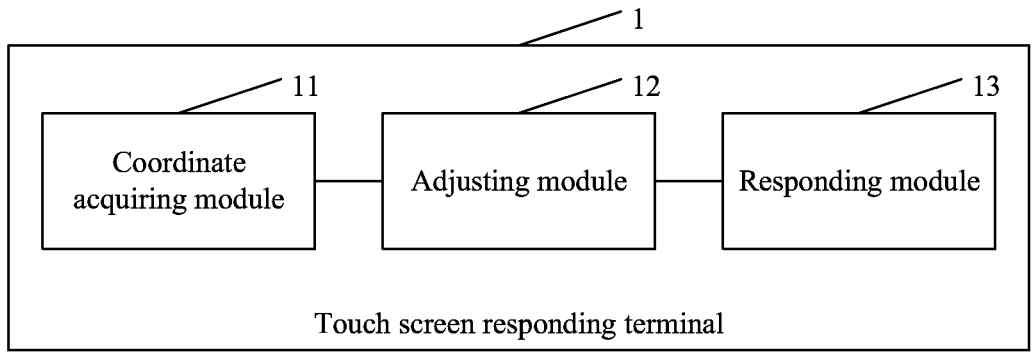
FIG. 5 is a schematic structural diagram of a touchscreen response terminal according to an embodiment of the present invention.

Referring to FIG. 5. FIG. 5 is a schematic structural diagram of a touchscreen response terminal according to an embodiment of the present invention. As illustrated in FIG. 5, a terminal 1 according to an embodiment of the present invention includes: a coordinate acquiring module 11, an adjusting module 12, and a responding module 13.

The coordinate acquiring module 11 is configured to acquire center point coordinates of a touch when a touchscreen receives a touch operation.

In specific implementation, when the touchscreen receives the touch operation, preferably, a coordinate obtaining module 11 acquires the area that a user's finger touches on the touchscreen, and extracts center point coordinates of the area. The center point coordinates may be coordinate values of the center point or pixel values of the center point.

Figure 6:
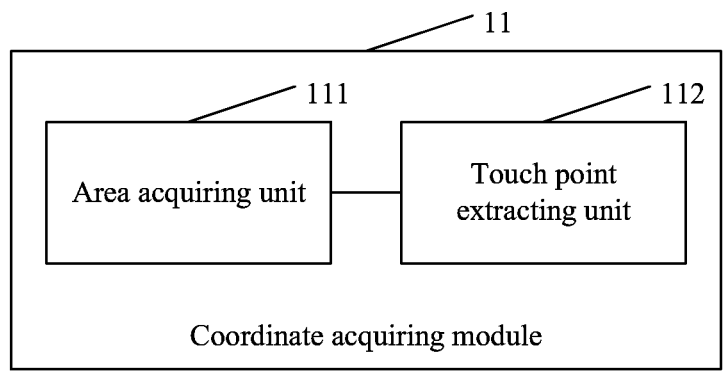
FIG. 6 is a schematic structural diagram of a coordinate obtaining module according to an embodiment of the present invention.

Specifically, referring to FIG. 6 at the same time, FIG. 6 is a schematic structural diagram of a coordinate obtaining module according to an embodiment of the present invention. As illustrated in FIG. 6, the coordinate obtaining module 11 includes an area acquiring unit 111 and a touch point extracting unit 112.

The area acquiring unit 111 is configured to acquire area information about an area touched by a user on a touchscreen.

Specifically, when the touchscreen receives the touch operation of the user, the area obtaining unit 111 may obtain the are information about an area touched by the user's finger on the touchscreen, where the area information includes a plurality of pixels.

The touch point extracting unit 112 is configured to extract center point coordinates of the touch according to the area information.

In specific implementation, the touch point extracting unit 112 may extract coordinates of the center pixel according to coordinates of the plurality of pixels included in the area information that is obtained by the area obtaining unit 111.

The adjusting module 12 is configured to adjust the center point coordinates of the touch according to the mode of a terminal and the gradient of the touchscreen.

Specifically, the mode of the terminal may be a portrait mode or a landscape mode, and the gradient of the touchscreen may be an angle between the touchscreen and the horizontal plane. Preferably, the adjusting module 12 adjusts the center point coordinates of the touch of the user according to the present mode of the terminal and the angle between the touchscreen and the horizontal plane.

Figure 7:
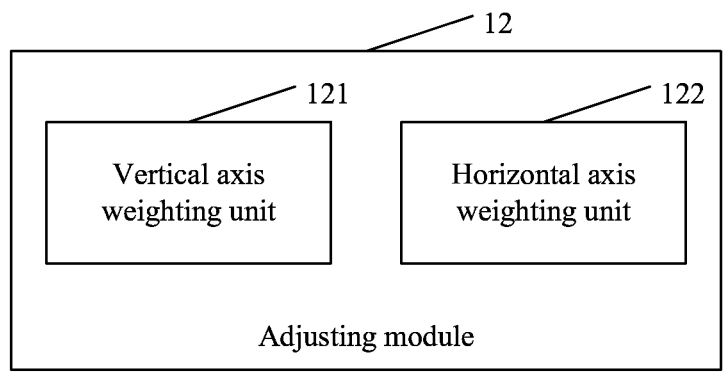
FIG. 7 is a schematic structural diagram of an adjusting module according to an embodiment of the present invention.

Specifically, referring to FIG. 7 at the same time, FIG. 7 is a schematic structural diagram of an adjusting module according to an embodiment of the present invention. As illustrated in FIG. 7, the adjusting module 12 includes: a vertical axis weighting unit 121 and a horizontal axis weighting unit 122.

The vertical axis weighting unit 121 is configured to adjust the center point coordinates of the touch when the terminal is in the portrait mode.

In specific implementation, referring to FIG. 2 at the same time, FIG. 2 is a schematic diagram of a portrait mode of a terminal according to an embodiment of the present invention. As illustrated in FIG. 2, when the terminal is in the portrait mode, the terminal may identify by default the bottom side of the touchscreen as an X axis and the left side of the touchscreen as a Y axis. In this case, a range of the angle between the touchscreen and the horizontal plane may be from −90 degrees to 90 degrees.

In a first implementation manner, the center point coordinates are the coordinate values of the center point; when the angle is from 0 degree to 4 degrees or from −4 degrees to 0 degree, 0 is added to the vertical coordinate value of the center point of the touch; when the angle is from 5 degrees to 30 degrees or from −30 degrees to −5 degrees, 1 is added to the vertical coordinate value of the center point of the touch; when the angle is from 31 degrees to 60 degrees or from −60 degrees to −31 degrees, 2 is added to the vertical coordinate value of the center point of the touch; when the angle is from 61 degrees to 90 degrees or from −90 degrees to −61 degrees, 3 is added to the vertical coordinate value of the center point of the touch.

In a second implementation manner, the center point coordinates are the pixel values of the center point; when the angle is from 0 degree to 4 degrees or from −4 degrees to 0 degree, 0 is added to the vertical pixel value of the center point of the touch; when the angle is from 5 degrees to 30 degrees or from −30 degrees to −5 degrees, 1 is added to the vertical pixel value of the center point of the touch; when the angle is from 31 degrees to 60 degrees or from −60 degrees to −31 degrees, 2 is added to the vertical pixel value of the center point of the touch; when the angle is from 61 degrees to 90 degrees or from −90 degrees to −61 degrees, 3 is added to the vertical pixel value of the center point of the touch.

The horizontal axis weighting unit 122 is configured to adjust the center point coordinates of the touch when the terminal is in the landscape mode.

In specific implementation, referring to FIG. 3 at the same time, FIG. 3 is a schematic diagram of a landscape mode of a terminal according to an embodiment of the present invention. As illustrated in FIG. 3, when the terminal is in the landscape mode, the terminal may identify by default the right side of the touchscreen as an X axis and the bottom side of the touchscreen as a Y axis. In this case, a range of the angle between the touchscreen and the horizontal plane may be from −180 to 180 degrees.

In a first implementation manner, the center point coordinates are the coordinate values of the center point; when the angle is from 1 degree to 4 degrees or from −4 degrees to −1 degree, 0 is added to the horizontal coordinate value of the center point of the touch; when the angle is from 5 degrees to 60 degrees, 1 is added to the horizontal coordinate value of the center point of the touch; when the angle is from 61 degrees to 120 degrees, 2 is added to the horizontal coordinate value of the center point of the touch; when the angle is from 121 degrees to 180 degrees, 3 is added to the horizontal coordinate value of the center point of the touch; when the angle is from −60 degrees to −5 degrees, 1 is subtracted from the horizontal coordinate value of the center point of the touch; when the angle is from −120 degrees to −61 degrees, 2 is subtracted from the horizontal coordinate value of the center point of the touch; and when the angle is from −180 degrees to −121 degrees, 3 is subtracted from the horizontal coordinate value of the center point of the touch. The horizontal coordinate value of the center point coordinates may be the horizontal coordinate value of the coordinates of the center point pixel.

In a second implementation manner, the center point coordinates are the pixel values of the center point; when the angle is from 1 degree to 4 degrees or from −4 degrees to −1 degree, 0 is added to the horizontal pixel value of the center point of the touch; when the angle is from 5 degrees to 60 degrees, 1 is added to the horizontal pixel value of the center point of the touch; when the angle is from 61 degrees to 120 degrees, 2 is added to the horizontal pixel value of the center point of the touch; when the angle is from 121 degrees to 180 degrees, 3 is added to the horizontal pixel value of the center point of the touch; when the angle is from −60 degrees to −5 degrees, 1 is subtracted from the horizontal pixel value of the center point of the touch; when the angle is from −120 degrees to −61 degrees, 2 is subtracted from the horizontal pixel value of the center point of the touch; and when the angle is from −180 degrees to 121 degrees, 3 is subtracted from the horizontal pixel value of the center point of the touch.

The responding module 13 is configured to respond to the touch operation according to the adjusted center point coordinates.

In specific implementation, the responding module 13 responds to the touch operation of the user according to the center point coordinates that have been adjusted by the adjusting module 12.

When a touchscreen receives the touch operation of the user, the area obtaining unit 111 of the coordinate obtaining module 11 obtains area information about an area that a user's finger touches on the touchscreen, and the touch point extracting unit 112 of the coordinate obtaining module 11 extracts the center point coordinates according to the area information.

If the terminal is in the portrait mode, the vertical axis weighting unit 121 of the adjusting module 12 adjusts the vertical coordinate value or vertical pixel value of the center point coordinates of a touch according to the angle between the touchscreen and the horizontal plane; and if the terminal is in the landscape mode, the horizontal axis weighting unit 122 of the adjusting module 12 adjusts the horizontal coordinate value or horizontal pixel value of the center point coordinates of a touch according to the angle between the touchscreen and the horizontal plane.

The responding module 13 responds to the touch operation of the user according to the center point coordinates that have been adjusted by the adjusting module 12.

In the embodiments of the present invention, the center point coordinates of a touch are accordingly adjusted by determining the mode of the terminal and the gradient of the touchscreen so as to respond to the touch operation of a user, which may enable a touchscreen response to the touch operation of the user to meet the actually intended use of the user, increase the accuracy of touch response, and improve touch experience of the user, and further enable the terminal to be more intelligent.

The modules or units in the embodiments of the present invention may be implemented by universal integrated circuit such as central processing unit (CPU) or application specific integrated circuit (ASIC).

In the method provided in the embodiments of the present invention, according to actual needs, the sequence of steps may be adjusted and the steps may be combined and deleted.

In the terminal provided in the embodiments of the present invention, modules and units may be combined, divided, and deleted according to actual needs.

Persons of ordinary skill in the art may understand that all or a part of the processes of the methods in the foregoing embodiments may be implemented by a computer program instructing relevant hardware. The program may be stored in a computer readable storage medium. When the program runs, the processes of the methods in the embodiments are performed. The storage medium may be a magnetic disc, an optical disc, a read-only memory (ROM), or a random access memory (RAM).

The foregoing descriptions are merely exemplary embodiments of the present invention, but are not intended to limit the protection scope of the present invention. Therefore, any equivalent variation made according to the claims of the present invention shall fall within the protection scope of the present invention.

What is claimed is:

1. A touchscreen response method, comprising:
   acquiring center point coordinates of a touch when a touchscreen receives a touch operation;
   adjusting the center point coordinates of the touch according to a mode of a terminal and a gradient of the touchscreen, wherein the mode of the terminal comprises a portrait mode and a landscape mode, and the gradient of the touchscreen is an angle between the touchscreen and a horizontal plane; and
   responding to the touch operation according to the adjusted center point coordinates.

2. The method according to claim 1, wherein the acquiring center point coordinates of a touch, comprises:
   acquiring area information about an area touched by a user on a touchscreen; and
   extracting center point coordinates of the touch according to the area information.

3. The method according to claim 1, wherein the adjusting center point coordinates of the touch according to a mode of the terminal and a gradient of the touchscreen, comprises:
   adding 0 to the vertical coordinate value of the center point of the touch when the angle is from 0 degree to 4 degrees or from −4 degrees to 0 degree;
   adding 1 to the vertical coordinate value of the center point of the touch when angle is from 5 degrees to 30 degrees or from −30 degrees to −5 degrees;
   adding 2 to the vertical coordinate value of the center point of the touch when angle is from 31 degrees to 60 degrees or from −60 degrees to −31 degrees; and
   adding 3 to the vertical coordinate value of the center point of the touch when the angle is from 61 degrees to 90 degrees or from −90 degrees to −61 degrees;
   wherein when the terminal is in the portrait mode, a range of the angle between the touchscreen and the horizontal plane is from −90 degrees to 90 degrees.

4. The method according to claim 1, wherein the adjusting center point coordinates of the touch according to a mode of the terminal and a gradient of the touchscreen, comprises:

adding 0 to the horizontal coordinate value of the center point of the touch when the angle is from 1 degree and 4 degrees or from −4 degrees to −1 degree;
adding 1 to the horizontal coordinate value of the center point of the touch when the angle is from 5 degrees to 60 degrees;
adding 2 to the horizontal coordinate value of the center point of the touch when the angle is from 61 degrees to 120 degrees;
adding 3 to the horizontal coordinate value of the center point of the touch when the angle is from 121 degrees to 180 degrees;
subtracting 1 from the horizontal coordinate value of the center point of the touch when the angle is from −60 degrees to −5 degrees;
subtracting 2 from the horizontal coordinate value of the center point of the touch when the angle is from −120 degrees to −61 degrees;
subtracting 3 from the horizontal coordinate value of the center point of the touch when the angle is from −180 degrees to −121 degrees;
wherein when the terminal is in the portrait mode, a range of the angle between the touchscreen and the horizontal plane is from −180 degrees to 180 degrees.

5. A touchscreen response terminal, comprising:
a coordinate acquiring module, configured to acquire center point coordinates of a touch when a touchscreen receives a touch operation;
an adjusting module, configured to adjust center point coordinates of the touch according to a mode of a terminal and a gradient of the touchscreen, wherein the mode of the terminal is obtained by calculating gravity acceleration and comprises a portrait mode and a landscape mode, and the gradient of the touchscreen is an angle between the touchscreen and a horizontal plane; and
a responding module, configured to respond to the touch operation according to the adjusted center point coordinates.

6. The terminal according to claim 5, wherein the coordinate acquiring module comprises:
an area acquiring unit, configured to acquire area information about an area that a user touches on a touchscreen; and
a touch point extracting unit, configured to extract center point coordinates of the touch according to the area information.

7. The terminal according to claim 5, wherein the adjusting module comprises:
a vertical axis weighting unit, configured to: add 0 to the vertical coordinate value of the center point of the touch when the terminal is in portrait mode and the angle is from 0 degree to 4 degrees or from −4 degrees to 0 degree;
add 1 to the vertical coordinate value of the center point of the touch when the angle is from 5 degrees to 30 degrees or from −30 degrees to −5 degrees;
add 2 to the vertical coordinate value of the center point of the touch when the angle is from 31 degrees to 60 degrees or from −60 degrees to −31 degrees; and
add 3 to the vertical coordinate value of the center point of the touch when the angle is from 61 degrees to 90 degrees or from −90 degrees to −61 degrees;
wherein when the terminal is in the portrait mode, a range of the angle between the touchscreen and the horizontal plane is from −90 degrees to 90 degrees.

8. The terminal according to claim 5, wherein the adjusting module comprises:
a horizontal axis weighting unit, configured to: add 0 to the horizontal coordinate value of the center point of the touch when the terminal is in landscape mode and the angle is from 1 degree to 4 degrees or from −4 degrees to −1 degree;
add 1 to the horizontal coordinate value of the center point of the touch when the angle is from 5 degrees to 60 degrees;
add 2 to the horizontal coordinate value of the center point of the touch when the angle is from 61 degrees to 120 degrees;
add 3 to the horizontal coordinate value of the center point of the touch when the angle is from 121 degrees to 180 degrees;
subtract 1 from the horizontal coordinate value of the center point of the touch when the angle is from −60 degrees to −5 degrees;
subtract 2 from the horizontal coordinate value of the center point of the touch when the angle is from −120 degrees to −61 degrees; and
subtract 3 from the horizontal coordinate value of the center point of the touch when the angle is from −180 degrees to −121 degrees;
wherein when the terminal is in the landscape mode, a range of the angle between the touchscreen and the horizontal plane is from −180 degrees to 180 degrees.

* * * * *